United States Patent [19]
Kobayashi

[11] Patent Number: 5,198,982
[45] Date of Patent: Mar. 30, 1993

[54] AUTOMOTIVE VEHICLE CONTROL SYSTEM FOR PREDICTING ROAD FRICTION LEVEL

[75] Inventor: Kazumitsu Kobayashi, Gunma, Japan

[73] Assignee: Japan Electronic Control Systems Co., Ltd., Isezaki, Japan

[21] Appl. No.: 631,005

[22] Filed: Dec. 19, 1990

[30] Foreign Application Priority Data

Dec. 19, 1989 [JP] Japan ................... 1-329139

[51] Int. Cl.[5] .............................................. B60K 28/16
[52] U.S. Cl. ........................... 364/426.02; 180/197; 73/105
[58] Field of Search ............ 364/426.02, 426.03, 364/565; 180/197; 73/105; 303/95, 100, 106, 105

[56] References Cited

U.S. PATENT DOCUMENTS

| | | | |
|---|---|---|---|
| 4,651,290 | 3/1987 | Masaki et al. | 73/105 |
| 4,672,547 | 6/1987 | Masaki et al. | 73/105 |
| 4,837,727 | 6/1989 | Tashiro et al. | 73/105 |
| 4,947,332 | 8/1990 | Ghoneim | 180/197 |
| 4,984,163 | 1/1991 | Kuwana et al. | 73/105 |
| 4,984,165 | 1/1991 | Müller et al. | 180/197 |
| 5,003,481 | 3/1991 | Matsuda | 364/426.02 |
| 5,034,890 | 7/1991 | Sugasawa et al. | 73/105 |
| 5,043,896 | 8/1991 | Sol | 180/197 |
| 5,090,511 | 2/1992 | Kabasin | 180/197 |

FOREIGN PATENT DOCUMENTS

| | | |
|---|---|---|
| 0298232 | 5/1988 | European Pat. Off. . |
| 0310270 | 9/1988 | European Pat. Off. . |
| 0318857 | 11/1988 | European Pat. Off. . |
| 0321931 | 12/1988 | European Pat. Off. . |
| 0338538 | 4/1989 | European Pat. Off. . |

*Primary Examiner*—Gary Chin
*Attorney, Agent, or Firm*—Foley & Lardner

[57] ABSTRACT

A traction control system for an automotive vehicle housing device for adjusting the driving torque delivered to driven wheels from an automotive internal combustion engine, and sensor for detecting vehicular deceleration and acceleration for generating a vehicular deceleration and acceleration indicative data. The system also performs the functions of monitoring the torque transmitted between a road surface and the driven wheel, generating a transmitted torque magnitude indicative data, and predicting road friction level on the basis of the vehicular deceleration and acceleration indicative data and the transmitted torque magnitude indicative data. Based on the road friction level, the system derives a torque criterion on the basis of the raod friction level. The system performs traction control in response to the transmitted torque magnitude indicative data greater than the torque criterion.

20 Claims, 5 Drawing Sheets

AUTOMOTIVE VEHICLE CONTROL SYSTEM FOR PREDICTING ROAD FRICTION LEVEL

BACKGROUND OF THE INVENTION

1. Field of the Invention

The present invention relates generally to a traction control system for an automotive vehicle, to maintain wheel slippage at a predetermined optimum level. More specifically, the invention relates to a traction control system, in which the magnitude of wheel slippage is detected in a novel way.

2. Description of the Background Art

In modern automotive technology, traction control systems are used to optimize vehicular driving performance. Such traction control systems activate in response to wheel slippage in excess of a predetermined wheel slippage threshold. Traction control is performed for reducing engine output and/or reducing driving torque at driven wheels for resuming wheel/road traction.

In the conventional traction control system, the traction control becomes active in response to wheel slippage in excess of the predetermined wheel slip threshold. This means that a conventional traction control system is only active after occurrence of acceptable level of wheel slippage. Therefore, the traction control will never be initiated until unacceptable wheel slippage occurs.

As can naturally be appreciated, in the ideal traction control, it is preferred to initiate traction control before wheel slippage falls into an unacceptable level.

SUMMARY OF THE INVENTION

Therefore, it is an object of the present invention to provide a traction control system for an automotive vehicle which can initiate traction control before wheel slippage becomes greater than a wheel slippage threshold.

According to one aspect of the invention, a traction control system for an automotive vehicle comprises:

first means for adjusting the driving torque delivered to the driven wheels from an automotive internal combustion engine;

second means for detecting vehicular deceleration and acceleration for generating a vehicular deceleration and acceleration indicative data;

third means for monitoring a torque transmitted between a road surface and the driven wheel for generating a transmitted torque magnitude indicative data;

fourth means for predicting road friction level on the basis of the vehicular deceleration and acceleration indicative data and the transmitted torque magnitude indicative data;

fifth means for deriving a torque criterion on the basis of the road friction level derived by the fourth means; and sixth means, responsive to the transmitted torque magnitude indicative data greater than the torque criterion, to control the first means for adjusting output torque of the engine and thereby adjusting the torque transmitted between the road surface and the driven wheel below the torque criterion.

The traction control system may further comprise seventh means for detecting application of a vehicular brake to generate a vehicular brake active state indicative signal, and the fourth means is active to derive the road friction level during active state of the vehicular brake. In such case, the fourth means may derive the road friction level as a function of the vehicular speed indicative data and the vehicular deceleration and acceleration indicative data. Furthermore, the fifth means may derive the torque criterion as a function of the road friction level.

The sixth means may be active to control the first means when the transmitted torque magnitude is greater than the torque criterion and the vehicle speed indicative data represents a vehicular speed higher than or equal to a predetermined vehicle speed criterion. Also, the fourth means may be active to derive the road friction level when the transmitted torque magnitude is smaller than the vehicle speed criterion. In this case, the fourth means may be active to derive the road friction level when the transmitted torque magnitude is smaller than the vehicle speed criterion.

The first means may control at least one of an intake air flow rate, a fuel injection amount and a spark ignition timing.

In the preferred embodiment, the second means monitors a rotation speed of the driven wheel as a vehicle speed representative data and derives the vehicle speed indicative data based thereon. Also, the fourth means may have a data map storing the variation characteristics of road friction level in relation to the vehicular deceleration and acceleration indicative data and the transmitted torque indicative data, and the fourth means deriving the road friction level by looking up the map in terms of the vehicular deceleration and acceleration indicative data and the transmitted torque indicative data. Furthermore, the fifth means may have a map storing variation characteristics of the torque criterion in relation to the road friction level to derive the torque criterion by map look-up in terms of the road friction level.

According to another aspect of the invention, a method of controlling driving torque delivery for driven wheels of an automotive vehicle for maintaining road/tire traction on the automotive vehicle at optimum level, comprises the steps of:

detecting vehicular deceleration and acceleration for generating a vehicular deceleration and acceleration indicative data;

monitoring the torque transmitted between a road surface and the driven wheel for generating a transmitted torque magnitude indicative data;

predicting road friction level on the basis of the vehicular deceleration and acceleration indicative data and the transmitted torque magnitude indicative data;

deriving a torque criterion on the basis of the road friction level derived;

detecting the transmitted torque magnitude indicative data greater than the torque criterion, for deriving a control value for adjusting output torque of an automotive internal combustion engine and whereby adjusting the the torque transmitted between the road surface and the driven wheel below the torque criterion; and.

adjusting driving torque delivered to driven wheels from an automotive internal combustion engine based on the control value.

According to a further aspect of the invention, a system for predicting road friction comprises:

means for detecting vehicular deceleration and acceleration for generating a vehicular deceleration and acceleration indicative data;

means for monitoring a torque transmitted between a road surface and the driven wheel for generating a transmitted torque magnitude indicative data; and means for predicting the road friction level on the basis of the vehicular deceleration and acceleration indicative data and the transmitted torque magnitude indicative data.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings.

DESCRIPTION OF THE PREFERRED EMBODIMENT

Figure 1:
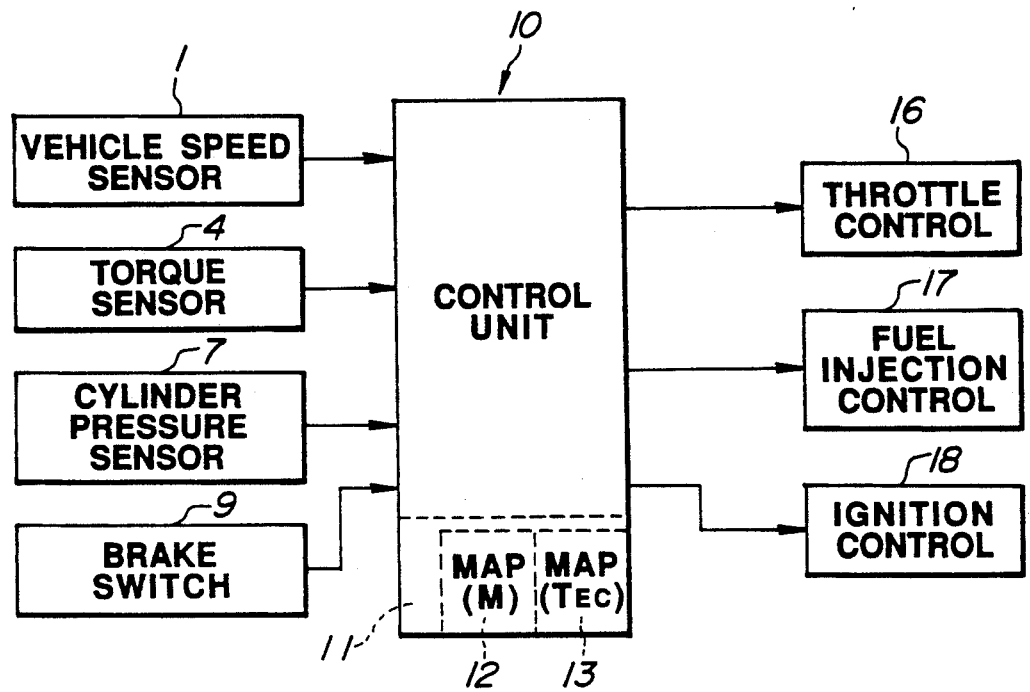
FIG. 1 is a block diagram of the preferred embodiment of a traction control system according to the present invention.
Figure 2:
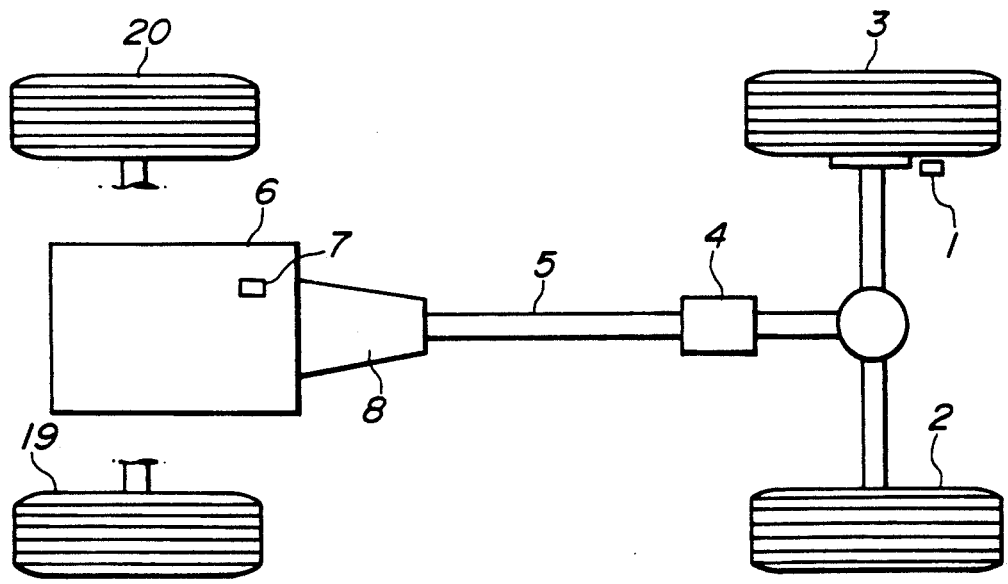
FIG. 2 is a diagrammatic illustration of a power train of an automotive vehicle, for which the preferred embodiment of the traction control system is applicable.

Referring now to the drawings, particularly to FIG. 1, the preferred embodiment of a traction control system, according to the present invention, includes a vehicle speed sensor 1, a torque sensor 4, a cylinder pressure sensor 7 and a brake switch 9 for respectively monitoring control parameters for performing traction control. The vehicle speed sensor 1, employed in the shown embodiment, is designed to monitor the rotation speed of a selected one of vehicular wheels as vehicle speed representative data. In practice, as can be seen from FIG. 2, in the shown embodiment, the vehicle speed sensor 1 is provided to monitor the rotation speed of rear-right wheel 3. Of course, the position of the vehicle speed sensor 1 is not limited to the rear-right wheel but can be applied for a rear-left wheel 2. Further in the alternative, it may also be possible to use the conventionally known vehicle speed sensor which monitors rotation speed of a propeller shaft 5 as an average rear wheel speed data and as the vehicle speed representative data. The vehicle speed sensor 1 thus produces a periodic signal, such as a pulse train, having a frequency proportional to the vehicle speed. The output of the vehicle speed sensor 1 will be hereafter referred to as a vehicle speed indicative signal V.

The torque sensor 4 is associated with the propeller shaft 5 for monitoring torque transmitted therethrough. Namely, the torque sensor 4 monitors a driving torque $T_B$ transmitted from an automotive internal combustion engine to the driving wheels 2 and 3 when the engine is driven in driving mode and a braking torque transmitted from the driving wheels to the engine while the engine is driven in braking mode. The torque sensor 4 thus generates a transmitted torque indicative signal.

The cylinder pressure sensor 7 is provided for monitoring pressure in an engine combustion chamber. The pressure sensor 7 may be a washer type pressure sensor mounted on the engine cylinder block or cylinder head together with an ignition plug. The cylinder pressure sensor 7 produces a cylinder pressure indicative signal P representative of the pressure in the engine combustion chamber. The pressure indicative signal P varies the signal value according to the engine cycle and becomes maximum $P_{max}$ in the vicinity of the top-dead-center (TDC) of the engine revolution cycle. On the other hand, the brake switch 9 is turned ON in response to application of vehicular brake, to indicate the deceleration state of the vehicle.

Figure 6:
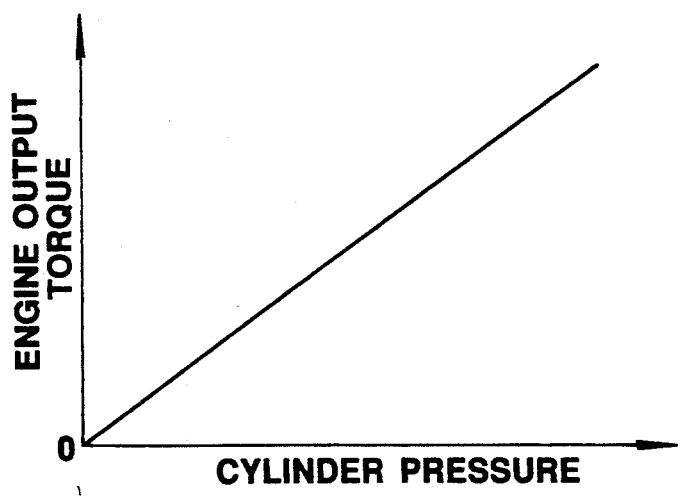
FIG. 6 is a chart showing engine output torque and a cylinder pressure.

As can be seen from FIG. 6, the maximum cylinder pressure $P_{max}$ of the engine combustion chamber is linearly proportional to the driving torque $T_{EO}$ to be transmitted through a power train. Therefore, by monitoring the maximum cylinder pressure $P_{max}$, the driving torque $T_{EO}$ can be detected.

The vehicle speed sensor 1, the torque sensor 4, the cylinder pressure sensor 7 and the brake switch 9 are connected to a control unit 10. The control unit 10 comprises a microprocessor which has a memory unit 11 including a ROM, a RAM and so forth. The memory unit 11 contains data maps 12 and 13, storing data of road friction $\mu$ and traction control initiation torque $T_{EC}$. The map 12 storing the road friction data $\mu$ will be hereafter referred to as "friction data map". On the other hand, the map 13 storing the traction control initiation torque $T_{EC}$ will be hereafter referred to as "traction control torque data map".

Figure 3:
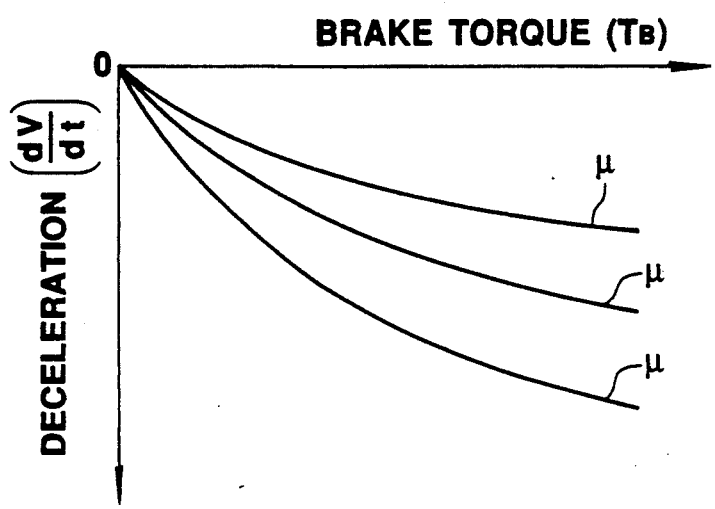
FIG. 3 is a chart showing the relationship between road friction $\mu$ and brake torque and deceleration.
Figure 4:
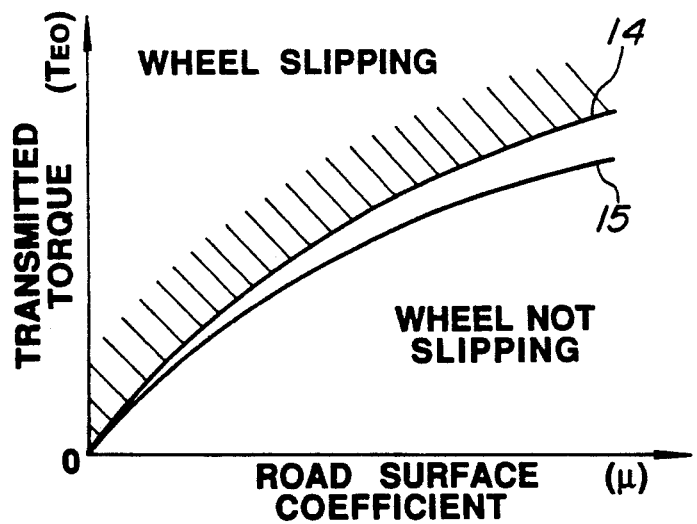
FIG. 4 is a chart showing the relationship between wheel slippage and transmitted drive torque and the road surface friction.
Figure 5:
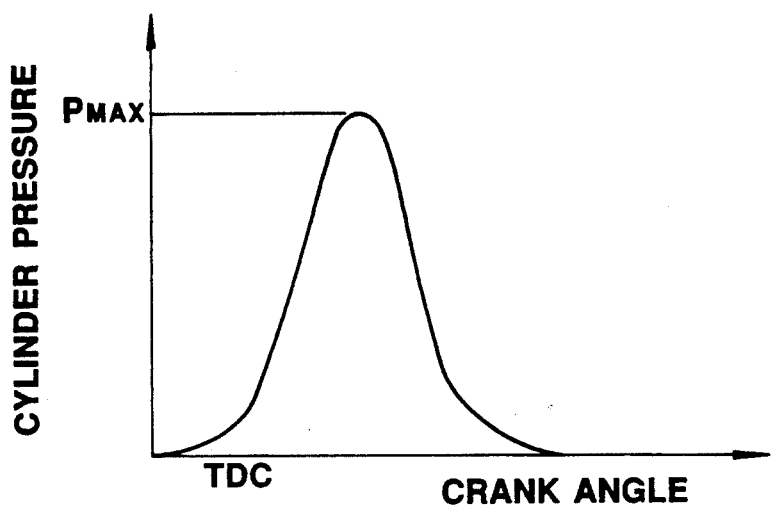
FIG. 5 is a chart showing the relationship between a cylinder pressure and the crank angle.

The friction data map 12 represents the relationship between deceleration magnitude $-dV/dt$ and braking torque $T_B$, as shown in FIG. 3. Namely, deceleration magnitude of vehicle is variable depending upon magnitude of braking force and road/tire traction. The road/tire traction is variable, depending upon the road surface friction $\mu$. Namely, on a slippy road, such as a snow covered road, an icy road and so forth, a large braking force may cause significant magnitude of wheel slippage and in the worst case, lead wheel locking, to significantly lower vehicular deceleration magnitude. Therefore, at the equal braking force, deceleration magnitude can be variable significantly depending upon the road surface friction. Therefore, by observing magnitude of deceleration and braking force, the road surface friction level can be predicted with satisfactorily high precision level. The friction data map 12 thus stores the variation characteristics of the vehicular deceleration relative to the braking torque $T_B$ as illustrated in FIG. 3.

The friction data map 12 can be established by experimentation and thus preliminarily stored.

On the other hand, the traction control torque data map 13 represents characteristics of road/tire torque transmission at the driven wheels. As can be seen, the road/tire torque transmission characteristics are variable, depending upon the road surface friction coefficient $\mu$. In the shown map, the criterion line 14 represents a wheel slip criterion. The wheel lip criterion is set at a torque transmitted between the road surface and the wheel across which possibility of occurrence of unacceptable magnitude of wheel slippage becomes substantially high. The criterion line 14 will thus hereafter referred to as "wheel slip criterion line". On the other hand, the criterion line 15 represents a criterion to initiate traction control when the torque transmitted between the road surface and the wheel increase thereacross. Therefore, the criterion line 15 may be hereafter referred to as "traction control initiation criterion line". In the shown embodiment, discrimination is made whether traction control is to be performed or not depending upon the magnitude of torque to be transmitted between the road surface and the wheel.

In practice, it may be possible to use the wheel slip criterion line 14 as the traction control initiation criterion line. However, since the transmitted torque magnitude may be variable depending not only upon the road surface friction but also upon other factors, such as vehicular load condition which is variable, depending upon number of boarding passengers, luggage weight, depth of the tire tread pattern and so forth, it is preferred to set the traction control initiation criterion line slightly lower than the torque magnitude at the wheel slip criterion line.

The control unit 10 performs traction control by controlling a throttle valve angular position, a fuel injection amount and a spark ignition timing. Therefore, the control unit 10 is associated with a throttle control system 16, a fuel injection control system 17 and an ignition control system 18. The throttle control system 16 may includes a throttle servo system which drives a throttle valve (not shown) to a desired angular position. The throttle control system 16 with the throttle servo system can be of any constructions which can perform adjustment of the throttle valve angular position to a commanded position. Therefore, any known constructions of throttle control systems may be applicable for implementing the shown embodiment. Similarly, the fuel injection system 17 can be of any constructions which can adjust the duel delivery amount. Therefore, any known fuel injection control systems are applicable for implementing the shown embodiment of the invention. Furthermore, the spark ignition control system can be of any known systems.

Figure 7A:
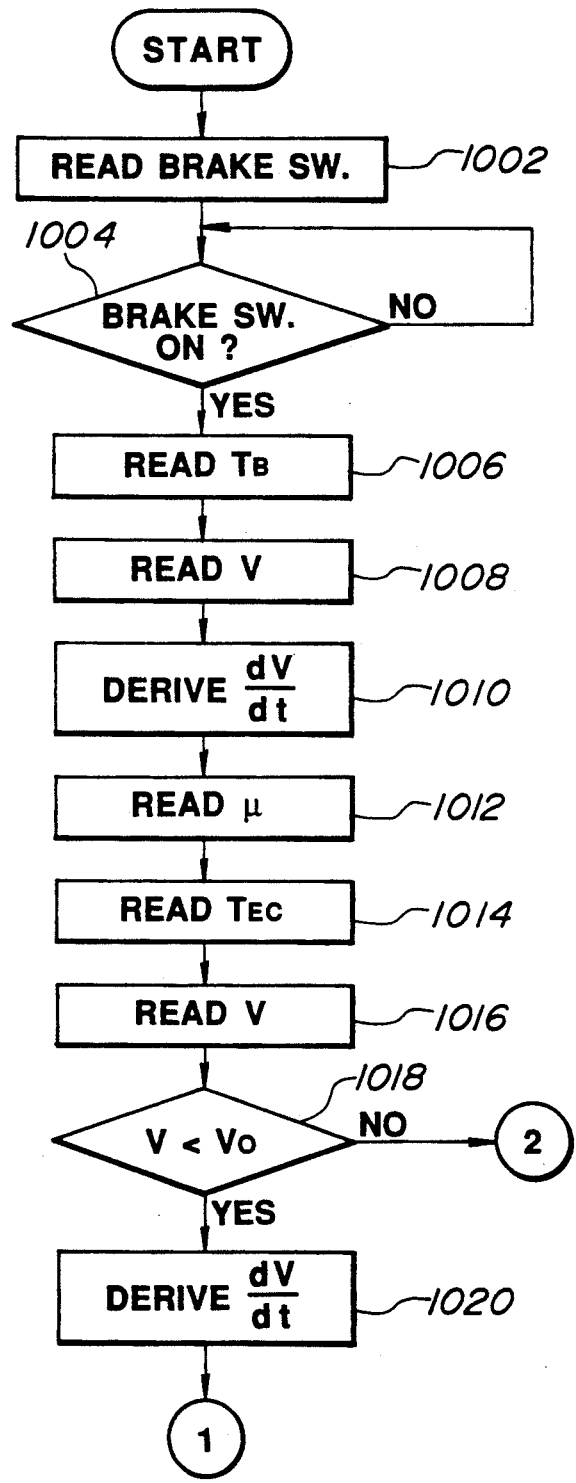
FIGS. 7(A) and 7(B) are flowcharts showing routines for performing traction control according to the invention.
Figure 7B:
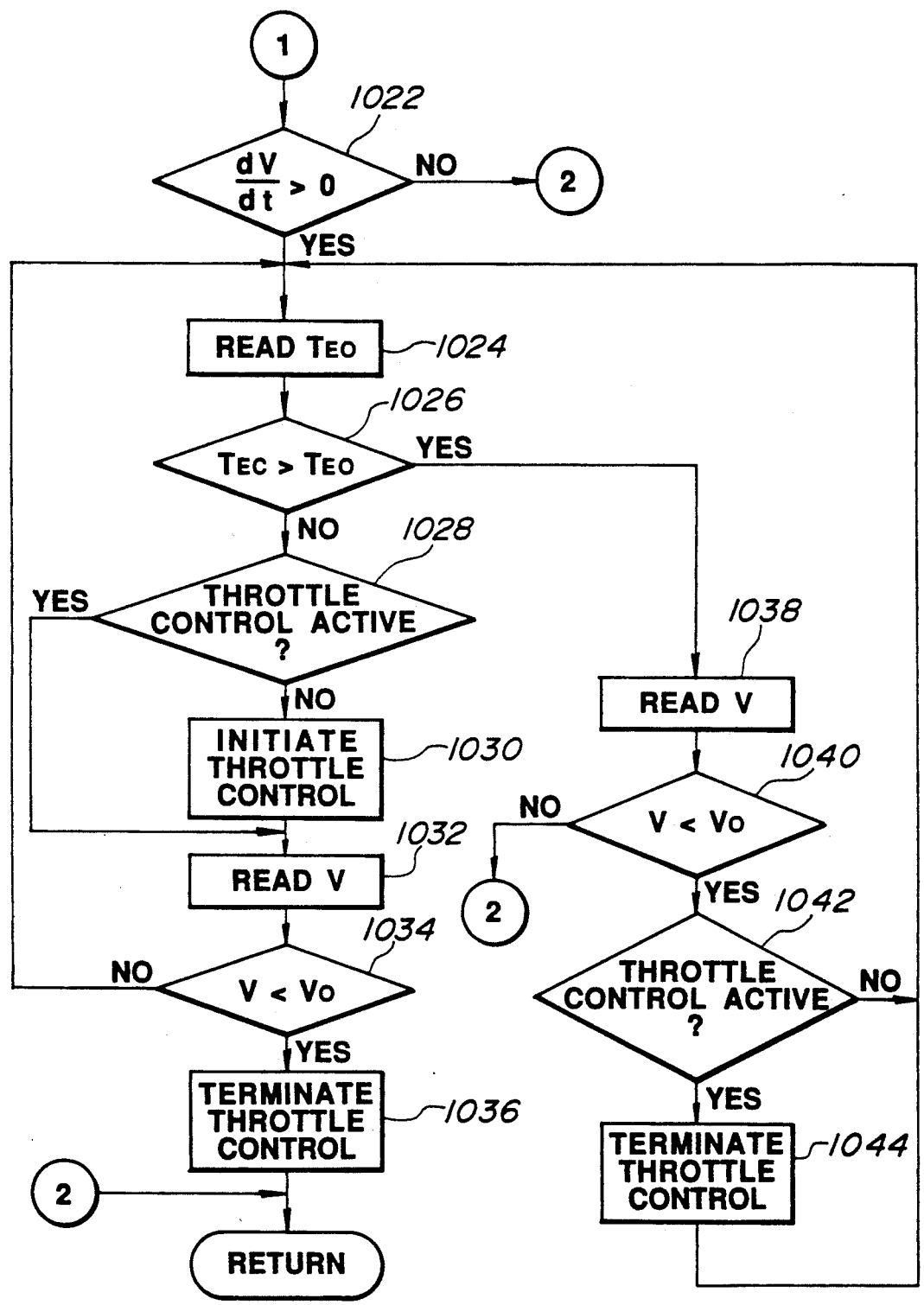

The operation of the shown embodiment of the traction control system will be discussed herebelow with reference to FIGS. 7(A) and 7(B). The routine shown in FIGS. 7(A) and 7(B) is triggered every predetermined interval. The shown routine is designed to be triggered at every predetermined timing, and thus is executed as an interrupt routine to be executed interrupting a main routine as the background job. It should be appreciated that as can be seen from the following discussion and FIGS. 7(A) and 7(B), the routine of FIG. 7(A) can be executed every occasion of application of brake. On the other hand, it is also possible to cyclically or periodically executing the routine of FIG. 7(A) for sampling road friction data and whereby deriving the traction control initiation torque $T_{EC}$. On the other hand, the process of FIG. 7(B) is executed periodically in order to discriminate the vehicle driving condition to activate and deactivate traction control according to the invention.

Immediately after starting execution of routine in FIGS. 7(A) and 7(B), the output signal level of the brake switch 9 is read output at a step 1002. The brake switch output is then checked whether brake switch 9 is turned ON or not at a step 1004. Namely, at the steps 1002 and 1004, the application state of the vehicular brake is turned checked. The steps 1002 and 1004 is repeated until application of braking force is applied. When the braking switch 9 is turned ON, thus, application of the braking force is detected, braking torque $T_B$ will be read out at a step 1006. Thereafter, the vehicle speed sensor indicative signal V is read out at a step 1008. Thereafter, vehicular deceleration dV/dt is derived based on variation of the vehicle speed indicative signal, at a step 1010. Thereafter, map look up is performed for deriving road surface friction, utilizing the friction data map 12, at step 1012. In practice, map look-up is performed in terms of the vehicular deceleration magnitude dV/dt and the braking force magnitude $T_B$ for deriving the road friction $\mu$. Based on the road friction $\mu$, derived at the step 1012, the traction control initiation torque $T_{EC}$ will be read output at a step 1014.

Though the foregoing process of FIG. 7(A), the traction control initiating torque $T_{EC}$ can be derived and set for subsequent traction control routines.

On the other hand, immediately after starting execution of the routine of FIG. 7(B), the vehicle speed indicative signal V is read output at a step 1016. Thereafter, the vehicle speed indicative signal V is compared with a vehicle speed criterion indicative signal $V_O$. The target vehicle speed $V_O$ is set at a value corresponding to a vehicle speed which is sufficiently high so as not to require the traction control, e.g. 20 km/h.

If the vehicle speed V is higher than or equal to the target vehicle speed $V_O$, the process directly goes END. In such case, process returns to the background job.

On the other hand, if the vehicle speed is lower than the vehicle speed criterion indicative data $V_O$, the acceleration data dV/dt is derived by differentiating the vehicle speed V at a step 1020. Then, the vehicle acceleration data dV/dt is checked for discrimination whether the vehicle is accelerating and decelerating at a step 1022. If the vehicular acceleration dV/dt is smaller than zero as checked at the step 1022, process directly goes END.

If the vehicle acceleration dV/dt is greater than or equal to zero, the torque data $T_{EO}$ of the transmitted between the road surface and the wheel is read out at a step 1024. In practice, the torque data $T_{EC}$ is compared with the traction control initiating torque data $T_{EC}$ at a step 1026.

When the torque data $T_{EO}$ as checked at the step 1026 is smaller than or equal to the traction control initiation torque $T_{EC}$, process goes to a step 1038. At the step 1038, the vehicle speed indicative data V is read out. The vehicle speed indicative data V as read at the step 1038 is compared with the vehicle speed criterion data $V_O$ at a step 1040. When the vehicle speed indicative data V is greater than the vehicle speed criterion data $V_O$, process directly goes END. On the other hand, when the vehicle speed indicative data V is smaller than the vehicle speed criterion data $V_O$, a check is performed as to whether the traction control is active, at a step 1042. If not, process returns to the step 1024. On the other hand, if active state of the traction control is detected as checked at the step 1042, the throttle control is terminated at a step 1044. After termination of the traction control, process goes to the step 1024.

On the other hand, when the torque data $T_{EO}$ is smaller than or equal to the traction control initiation torque $T_{EC}$ as checked at the step 1026, check is performed whether the traction control is active at a step 1028. If the traction control as checked at the step 1028 is not active, the traction control is initiated at a step 1030. In the active state of the traction control, throttle angle control, fuel injection control and ignition timing control are performed in order to adjust the output torque of the engine to be lower so that the torque $T_{EO}$ can be maintained to be lower than the traction control initiation torque $T_{EC}$. On the other hand, if the traction control as checked at the step 1028 is active, process jumps the step 1030.

At a step 1032 the vehicle speed indicative data V is read out. Then, the vehicle speed indicative data V is compared with a vehicle speed criterion $V_O$ at a step 1034. When the vehicle speed indicative data V is greater than or equal to the vehicle speed criterion $V_O$ as checked at the step 1034, the process returns to the step 1024. On the other hand, when the vehicle speed indicative data V is smaller than the vehicle speed criterion $V_O$, the throttle control is terminated at a step 1036.

As can be appreciated therefrom, according to the present invention, magnitude wheel slippage can be predicted for initiating traction control before actually causing the wheel slip in unacceptable magnitude. Therefore, the road/tire traction can be constantly maintained at a level sufficiently high for providing satisfactorily high level of vehicular driving stability.

While the present invention has been discussed here above in terms of the preferred embodiment of the invention, the invention can be embodied in various ways. Therefore, the invention should be understood to include all possible embodiments and modifications which can be implemented without departing from the principle of the invention.

For example, though the shown embodiment derives the road surface friction during vehicular deceleration state. It may also be possible to derive the road surface friction level while the driven wheels are driven by the engine output torque. In such case, the wheel slippage during vehicular acceleration state may be derived based on the difference of the rotation speed of the driven wheels and the rotation speed of non-driven speed which are free from the driving torque of the engine.

I claim:

1. A traction control system for an automotive vehicle, comprising:
   first means for adjusting a driving torque delivered to the driven wheels of the vehicle from an automotive internal combustion engine;
   second means for detecting vehicular deceleration and acceleration and generating vehicular deceleration and acceleration indicative data;
   third means for monitoring a torque transmitted between a road surface and said driven wheels, for generating transmitted torque magnitude indicative data;
   fourth means for predicting road friction level on the basis of said vehicular deceleration and acceleration indicative data and said transmitted torque magnitude indicative data;
   fifth means for deriving a torque criterion on the basis of said road friction level derived by said fourth means; and
   sixth means, responsive to said transmitted torque magnitude indicative data greater than said torque criterion, for performing a control for said first means for adjusting the output torque of said engine and thereby adjusting said torque transmitted between said road surface and said driven wheels below said torque criterion.

2. A traction control system as set forth in claim 1, which further comprises a seventh means for detecting application of a vehicular brake to generate a vehicular brake active state indicative signal, and said fourth means is active to derive said road friction level during active state of the vehicular brake.

3. A traction control system as set forth in claim 2, wherein said fourth means derives said road friction level as a function of vehicular speed indicative data and said vehicular deceleration and acceleration indicative data.

4. A traction control system as set forth in claim 2 wherein said sixth means is active to control said first means when said transmitted torque magnitude is greater than said torque criterion and vehicle speed indicative data represents a vehicular speed higher than or equal to a predetermined vehicle speed criterion.

5. A traction control system as set forth in claim 2, wherein said fourth means is active to derive said road friction level when said transmitted torque magnitude is smaller than a vehicle speed criterion.

6. A traction control system as set forth in claim 4, wherein said fourth means is active to derive said road friction level when said transmitted torque magnitude is smaller than a vehicle speed criterion.

7. A traction control system as set forth in claim 1, wherein said first means controls at least one of an intake air flow rate, a fuel injection amount and a spark ignition timing.

8. A traction control system as set forth in claim 1, wherein said second means monitors a rotation speed of one of said driven wheels as a vehicle speed representative data and derives vehicle speed indicative data based thereon.

9. A traction control system as set forth in claim 1, wherein said fourth means has a data map storing a variation characteristics of said road friction level in relation to said vehicular deceleration and acceleration indicative data and said transmitted torque indicative data, and said fourth means deriving said road friction level by looking up the map in terms of said vehicular deceleration and acceleration indicative data and said transmitted torque indicative data.

10. A traction control system as set forth in claim 1, wherein said fifth means has a data map storing variation characteristics of said torque criterion in relation to said road friction level to derive said torque criterion by map look-up in terms of said road friction level.

11. A method of controlling driving torque delivery for driven wheels of an automotive vehicle for maintaining road/tire traction on the automotive vehicle at optimum level, comprising the steps of:
   detecting vehicular deceleration and acceleration for generating the vehicular deceleration and acceleration indicative data;
   monitoring a torque transmitted between a road surface and said driven wheels for generating a transmitted torque magnitude indicative data;
   predicting road friction level on the basis of said vehicular deceleration and acceleration indicative data and said transmitted torque magnitude indicative data;
   deriving a torque criterion on the basis of said road friction level derived;
   detecting said transmitted torque magnitude indicative data greater than said torque criterion, for deriving a control value for adjusting output torque of an automotive internal combustion engine and whereby adjusting said torque transmitted between said road surface and said driven wheels below said torque criterion; and, adjusting driving torque delivered to said driven wheels from an automotive internal combustion engine based on said control value.

12. A method as set forth in claim 11, which further comprises a step of detecting application of a vehicular brake to derive said road friction level during active state of the vehicular brake.

13. A method as set forth in claim 12, wherein said road friction level is derived as a function of vehicular speed indicative data and said vehicular deceleration and acceleration indicative data.

14. A method as set forth in claim 12, wherein said adjustment of said driving torque is performed when said transmitted torque magnitude is greater than said torque criterion and vehicle speed indicative data represents a vehicular speed higher than or equal to a predetermined vehicle speed criterion.

15. A method as set forth in claim 12, wherein said road friction level is derived when said transmitted torque magnitude is smaller than a vehicle speed criterion.

16. A method as set forth in claim 14, wherein said road friction level is derived when said transmitted torque magnitude is smaller than said vehicle speed criterion.

17. A method as set forth in claim 11, wherein the adjustment of the driving torque is performed by controlling at least one of an intake air flow rate, a fuel injection amount and a spark ignition timing.

18. A system for predicting road friction comprising:
means for detecting vehicular deceleration and acceleration for generating a vehicular deceleration and acceleration indicative data;
means for monitoring a torque transmitted between a road surface and a driven wheel for generating a transmitted torque magnitude indicative data; and
means for predicting road friction level on the basis of said vehicular deceleration and acceleration indicative data and said transmitted torque magnitude indicative data.

19. A system as set forth in claim 18, which further comprises means for detecting application of a vehicular brake to generate a vehicular brake active state indicative signal, and said road friction level predicting means is active to derive said road friction level during active state of the vehicular brake.

20. A system as set forth in claim 19, wherein said road friction level predicting means derives said road friction level as a function of vehicular speed indicative data and said vehicular deceleration and acceleration indicative data.

* * * * *